United States Patent
Kim et al.

(10) Patent No.: US 10,963,368 B2
(45) Date of Patent: *Mar. 30, 2021

(54) METHOD OF TESTING PROTOTYPE LINKED WITH EXISTING APPLICATION

(71) Applicant: STUDIO XID KOREA, INC., Seoul (KR)

(72) Inventors: Soo Kim, Hwaseong-si (KR); Jae Won Song, Seoul (KR)

(73) Assignee: STUDIO XID KOREA, INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/517,261

(22) Filed: Jul. 19, 2019

(65) Prior Publication Data

US 2019/0340111 A1 Nov. 7, 2019

Related U.S. Application Data

(63) Continuation of application No. 15/821,236, filed on Nov. 22, 2017, now Pat. No. 10,409,710.

(30) Foreign Application Priority Data

Sep. 14, 2017 (KR) .......................... 10-2017-0118048

(51) Int. Cl.
*G06F 11/36* (2006.01)
*G06F 11/30* (2006.01)
(Continued)

(52) U.S. Cl.
CPC .......... *G06F 11/3672* (2013.01); *G06F 3/048* (2013.01); *G06F 11/302* (2013.01);
(Continued)

(58) Field of Classification Search
CPC ...... G06F 11/30; G06F 11/302; G06F 11/362; G06F 11/3664; G06F 11/3672;
(Continued)

(56) References Cited

U.S. PATENT DOCUMENTS

| | | | |
|---|---|---|---|
| 2010/0192122 A1* | 7/2010 | Esfahan et al. | G06F 8/35 717/105 |
| 2017/0131779 A1* | 5/2017 | Walkin | G06F 8/38 |

FOREIGN PATENT DOCUMENTS

| | | | |
|---|---|---|---|
| JP | 2001-318811 A | 11/2001 | |
| JP | 2005-018227 A | 1/2005 | |

(Continued)

OTHER PUBLICATIONS

A Decision to Grant issued by the Japanese Patent Office dated May 28, 2019, which corresponds to Japanese Patent Application No. 2017-224758 and is related to U.S. Appl. No. 15/821,236; with English Translation.

(Continued)

*Primary Examiner* — Wei Y Zhen
*Assistant Examiner* — Mohammed N Huda
(74) *Attorney, Agent, or Firm* — Studebaker & Brackett PC

(57) ABSTRACT

Provided is a method of testing a prototype linked with an application without rebuilding the application. The method is performed by a user terminal in which the application is installed and comprises activating the application built to comprise a prototype controller, loading the prototype and setting the prototype to be displayed on a prototype area, which is at least part of a prototype controller area allocated to the prototype controller, in a screen of the application by using the prototype controller, receiving at least some of input events generated for the application with top priority by using the prototype controller and sending the received (Continued)

input events to the application as they are or sending the received input events to the loaded prototype by using the prototype controller.

7 Claims, 13 Drawing Sheets

(51) Int. Cl.
  *G06F 3/048* (2013.01)
  *G06F 8/34* (2018.01)
  *G06F 8/35* (2018.01)
(52) U.S. Cl.
  CPC ............ *G06F 11/3696* (2013.01); *G06F 8/34* (2013.01); *G06F 8/35* (2013.01)
(58) Field of Classification Search
  CPC .......... G06F 11/3696; G06F 8/35; G06F 8/38; G06F 3/048; G06F 3/0482; G06F 3/04847; G06F 17/50; G06F 8/34; G06F 3/04883; G06F 17/5009

USPC ........................................................ 717/125
  See application file for complete search history.

(56) References Cited

FOREIGN PATENT DOCUMENTS

| | | |
|---|---|---|
| KR | 10-1594946 B1 | 11/2001 |
| KR | 10-1009424 B1 | 1/2011 |
| KR | 10-1640377 B1 | 7/2016 |
| KR | 10-1653795 B1 | 9/2016 |
| KR | 10-1653797 B1 | 9/2016 |
| KR | 10-1701822 B1 | 2/2017 |

OTHER PUBLICATIONS

A Notice of Allowance issued by the Korean Patent Office dated Jun. 27, 2019, which corresponds to Korean Patent Application No. 10-2017-0118048 and is related to U.S. Appl. No. 15/821,236; with English Translation.

* cited by examiner

METHOD OF TESTING PROTOTYPE LINKED WITH EXISTING APPLICATION

CROSS-REFERENCE TO RELATED APPLICATIONS

This application is a Continuation of U.S. patent application Ser. No. 15/821,236 filed Nov. 22, 2017, which claims the benefit of Korean Patent Application No. 10-2017-0118048, filed on Sep. 14, 2017, in the Korean Intellectual Property Office, the disclosure of which is incorporated herein by reference in its entirety.

BACKGROUND

1. Field

The present inventive concept relates to a method and apparatus for testing a prototype linked with an existing application, and more particularly, to a method of testing a prototype linked with an application without rebuilding the application and a user terminal in which the application is installed and which performs the method.

2. Description of the Related Art

Manufacturers of applications installed in user terminals such as smart devices are making a lot of effort to design a graphical user interface (GUI) in a way that increases the convenience and intuitiveness of a user. Various GUI prototypes are created and tested for convenience and intuitiveness before an application is released.

In conventional prototyping, a designer writes the design of a GUI that he conceives in a document such as a PowerPoint document and explains the GUI design to an application developer. Then, the application developer creates a prototype by implementing the GUI design as he understands the GUI design. In this process, however, the designer's thoughts are not correctly communicated to a programmer. In addition, since the application developer implements the design of the GUI based on his understanding, a final prototype is often different from the designer's idea, thus requiring rework.

In order to solve this problem of the conventional GUI prototyping method, a prototyping tool is used. The prototyping tool is a program tool that can be used to create a prototype, for example, by defining various interactions applied to the design of a GUI. If a designer or a general user learns how to use the prototyping tool, he can create a prototype quickly and easily.

In an operation such as user interface prototyping for some parts of screens of an application before the application is updated or released, if only some parts of screens or functions of an application, which has already been released and is being used by a user or has been almost developed, are to be updated, a prototype linked with the existing application needs to be tested. Accordingly, there is a need for a method of testing, by using various prototypes, whether, for example, some parts of a screen or function to be updated is switched smoothly to a screen or function not to be updated or whether a GUI to be updated is combined well with an existing GUI.

In addition, it is ineffective to receive the help of the developer of an application linked with a prototype whenever the prototype is replaced to test another prototype. Therefore, it is required to provide a method of testing a prototype linked with an application with minimum help from the developer of the application.

SUMMARY

Aspects of the inventive concept provide a method of testing a prototype linked with an existing application without requiring the help of the developer of the application when replacing the prototype and a user terminal performing the method.

Aspects of the inventive concept also provide a method of testing a prototype, the method enabling an application and a prototype to connect with each other regarding feedback such as user manipulation and sensor input by linking a prototype controller module to the application, and a user terminal performing the method.

Aspects of the inventive concept also provide a method of testing a prototype, the method enabling an application and a prototype to connect with each other regarding feedback such as user manipulation and sensor input by stacking the prototype on a prototype area of the application as a layer higher than the application, and a user terminal performing the method.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

According to an aspect of the inventive concept, there is provided a method of testing a prototype linked with an application without rebuilding the application. The method is performed by a user terminal in which the application is installed and comprises activating the application built to comprise a prototype controller, loading the prototype and setting the prototype to be displayed on a prototype area, which is at least part of a prototype controller area allocated to the prototype controller, in a screen of the application by using the prototype controller, receiving at least some of input events generated for the application with top priority by using the prototype controller and sending the received input events to the application as they are or sending the received input events to the loaded prototype by using the prototype controller.

According to another aspect of the inventive concept, there is provided a method, wherein the prototype controller comprises a topmost transparent screen formed in at least part of the application.

According to another aspect of the inventive concept, there is provided a method, wherein the activating of the application comprises activating the application to display a first screen in a state where the prototype controller is inactive, activating the prototype controller when the application displays a second screen and deactivating the prototype controller when the second screen of the application is switched to another screen.

According to another aspect of the inventive concept, there is provided a method, wherein the activating of the application comprises, activating the application in a state where the prototype controller is inactive, activating the prototype controller when a predetermined input event occurs to the application and deactivating the prototype controller when a condition for deactivating the prototype controller is satisfied.

According to another aspect of the inventive concept, there is provided a method, wherein the activating of the application comprises activating the application in a state where the prototype controller is inactive, activating the prototype controller when the application enters a predetermined state and deactivating the prototype controller when the state of the application is changed from the predetermined state to another state.

According to another aspect of the inventive concept, there is provided a method, wherein the setting of the prototype comprises receiving a message from the application by using the prototype controller, determining a prototype to be loaded based on the received message by using the prototype controller and loading the determined prototype without a user input by using the prototype controller.

According to another aspect of the inventive concept, there is provided a method, wherein the setting of the prototype comprises loading at least one of prototypes matching a display size of the user terminal among a plurality of prototypes stored in a prototype storage device.

According to another aspect of the inventive concept, there is provided a method, wherein the setting of the prototype comprises obtaining information about the prototype area from the loaded prototype.

According to another aspect of the inventive concept, there is provided a method, wherein the sending of the received input events to the application as they are or the sending of the received input events to the loaded prototype by using the prototype controller comprises receiving a user input indicating prototype loading and displaying a screen for selecting one or more of the prototypes stored in the storage device and loading a selected prototype and unloading a previously loaded prototype.

According to another aspect of the inventive concept, there is provided a method, wherein the user input indicating prototype loading is any one of user inputs not received by the application.

According to another aspect of the inventive concept, there is provided a method, wherein the setting of the prototype comprises loading a first prototype and a second prototype by using the prototype controller and displaying the first prototype and the second prototype by using the prototype controller such that the first prototype and the second prototype are stacked to at least partially overlap each other according to a priority order of the first prototype and the second prototype, and the sending of the received input events to the application as they are or the sending of the received input events to the loaded prototype by using the prototype controller comprises sending the received input events to the application as they are or sending the received input events to the first prototype and the second prototype by using the prototype controller.

According to another aspect of the inventive concept, there is provided a method, wherein the setting of the prototype further comprises changing the priority order of the first prototype and the second prototype by using the prototype controller when a predetermined user input is received.

According to another aspect of the inventive concept, there is provided a method, wherein the sending of the received input events to the application as they are or the sending of the received input events to the loaded prototype by using the prototype controller comprises sending the received input events to the application as they are, sending the received input events to the loaded prototype, or sending the received input events to the application as they are and, at the same time, sending the received input events to the loaded prototype by using the prototype controller, wherein the sending of the received input events to the application as they are or the sending of the received input events to the loaded prototype by using the prototype controller comprises sending a user input to the prototype area to the loaded prototype, sending a user input to the prototype controller area outside the prototype area to the application as it is and sending all input events excluding the user inputs to the application as they are and, at the same time, to the loaded prototype.

According to another aspect of the inventive concept, there is provided a method, wherein the sending of the received input events to the application as they are or the sending of the received input events to the loaded prototype by using the prototype controller comprises deactivating the prototype controller according to a signal generated by the loaded prototype in response to the input events sent to the loaded prototype.

According to another aspect of the inventive concept, there is provided a method, wherein the sending of the received input events to the application as they are or the sending of the received input events to the loaded prototype by using the prototype controller comprises changing the prototype controller area according to a signal generated by the loaded prototype in response to the input events sent to the loaded prototype.

According to another aspect of the inventive concept, there is provided a method of testing a prototype linked with an application without rebuilding the application. The method is performed by a user terminal in which the application is installed and comprises displaying the prototype on a prototype area, which is at least part of a screen of the application, as a layer higher than the application such that an input event in the prototype area of the application is received first by the prototype and sending an input event in a penetration area to the application as it is, wherein the prototype comprises the penetration area.

According to another aspect of the inventive concept, there is provided a method, wherein the penetration area is transparent.

According to another aspect of the inventive concept, there is provided a method, wherein the prototype further comprises a screen shot area, wherein the screen shot area is an area of the screen of the application which is filled with an image of the screen shot area when the prototype is displayed.

According to another aspect of the inventive concept, there is provided a user terminal comprises an application execution unit which activates an application built to comprise a prototype controller and a prototype controller which loads a prototype linked with the application without rebuilding the application and sets the prototype to be displayed on a prototype area, which is at least part of a prototype controller area allocated to the prototype controller, in a screen of the application, wherein the prototype controller receives at least some of input events generated for the application with top priority and sends the received input events to the application as they are or sends the received input events to the loaded prototype.

According to another aspect of the inventive concept, there is provided a computer program for identifying information of a computer system which is recorded on a non-transitory computer-readable medium comprising computer program instructions executable by a processor, wherein, when the computer program instructions are executed by a processor of a computing device, the computer program performs operations of activating an application built to comprise a prototype controller, loading a prototype and setting the prototype to be displayed on a prototype area, which is at least part of a prototype controller area allocated to the prototype controller, in a screen of the application by using the prototype controller, receiving at least some of input events generated for the application with top priority by using the prototype controller and sending the received input events to the application as they are or sending the received input events to the loaded prototype by using the prototype controller.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, preferred embodiments of the present invention will be described with reference to the attached drawings. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms including technical and scientific terms used herein have the same meaning as commonly understood by one of ordinary skill in the art to which this invention belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

Figure 1:
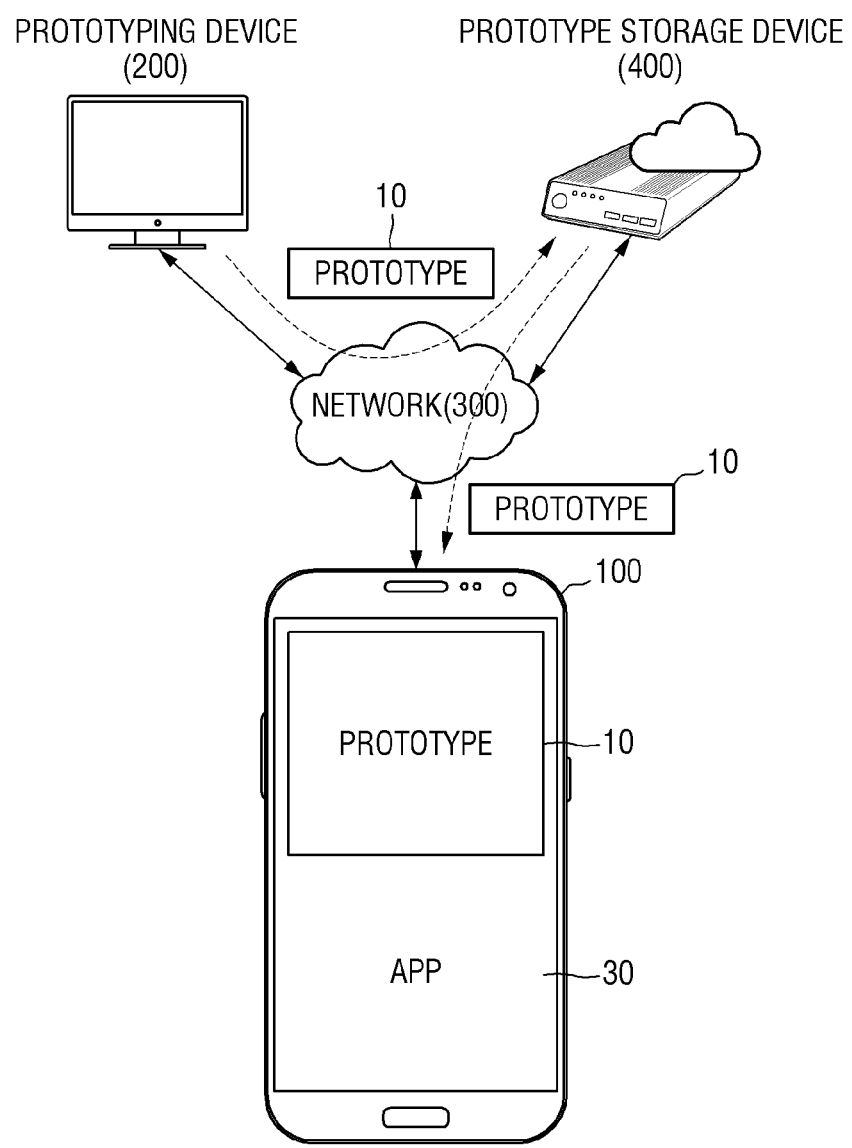
FIG. 1 illustrates the configuration of a prototype testing system according to an embodiment.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof. The configuration and operation of a prototype testing system according to an embodiment will be described with reference to FIG. 1. Referring to FIG. 1, the prototype testing system according to the current embodiment includes a prototype storage device 400 and a user terminal 100.

The prototype storage device 400 is a storage device that stores a prototype 10 created by a prototyping device 200 and is connected to a network 300. The prototype 10 is data created by a prototyping tool installed in the prototyping device 200. The prototype data 10 is data that can be interpreted by a prototype reproducing tool installed in the user terminal 100 or a prototype controller included in an application installed in the user terminal 100.

The prototyping device 200 is a computing device such as a tablet, a smartphone, a PC, or a notebook computer. A user application or a prototyping tool (not illustrated), which is embedded software of the computing device, may be installed in the prototyping device 200.

The user terminal 100 is a computing device such as a tablet, a smartphone, a notebook computer, or a PC. A prototype reproducing tool (not illustrated) which is user application software or an application 30 (shortened to 'APP' in the drawings) which will be linked with a prototype to be tested may be installed in the user terminal 100. The prototype reproducing tool may be user application software that interprets the prototype 10 and implements a user interface defined in the prototype 10.

The prototype controller also interprets the prototype 10 and implements the user interface defined in the prototype 10. However, the prototype controller, unlike the prototype reproducing tool, is an internal module of the application 30 which is linked with the application 30. That is, the prototype controller is linked with a module of the application 30 at the time of building the application 30 and is compiled.

The prototype controller loads and displays the prototype 10. When input events for the application 30 are generated, the prototype controller receives at least some of the input events with top priority. In order to receive the input events for the application 30 with top priority, the prototype controller includes a screen stacked on the application 30.

The prototype controller sends the received input events to the application 30 as they are or sends the received input events to the loaded prototype 10. For example, the prototype controller sends a touch input event in a prototype area to the prototype 10. In addition, the prototype controller sends a touch input event in an area other than the prototype area to the application 30. In addition, the prototype controller may send an input event other than the touch inputs to both the prototype 10 and the application 30.

At least part of the screen of the prototype controller is transparent. It is desirable for the entire screen of the prototype controller to be transparent. This is because only the screen of the prototype 10 and the screen of the application 30 should be displayed in order to perform a test in consideration of elements such as design and user emotion.

Various operations of the prototype controller will be described in detail later with reference to FIGS. 2 through 7.

The prototype testing system according to the current embodiment can be configured to not include the prototype storage device 400. In this case, the prototype 10 created by the prototyping device 200 may be stored in a storage unit of the user terminal 100. Thus, the prototype controller may load the prototype 10 stored in the storage unit.

Figure 2:
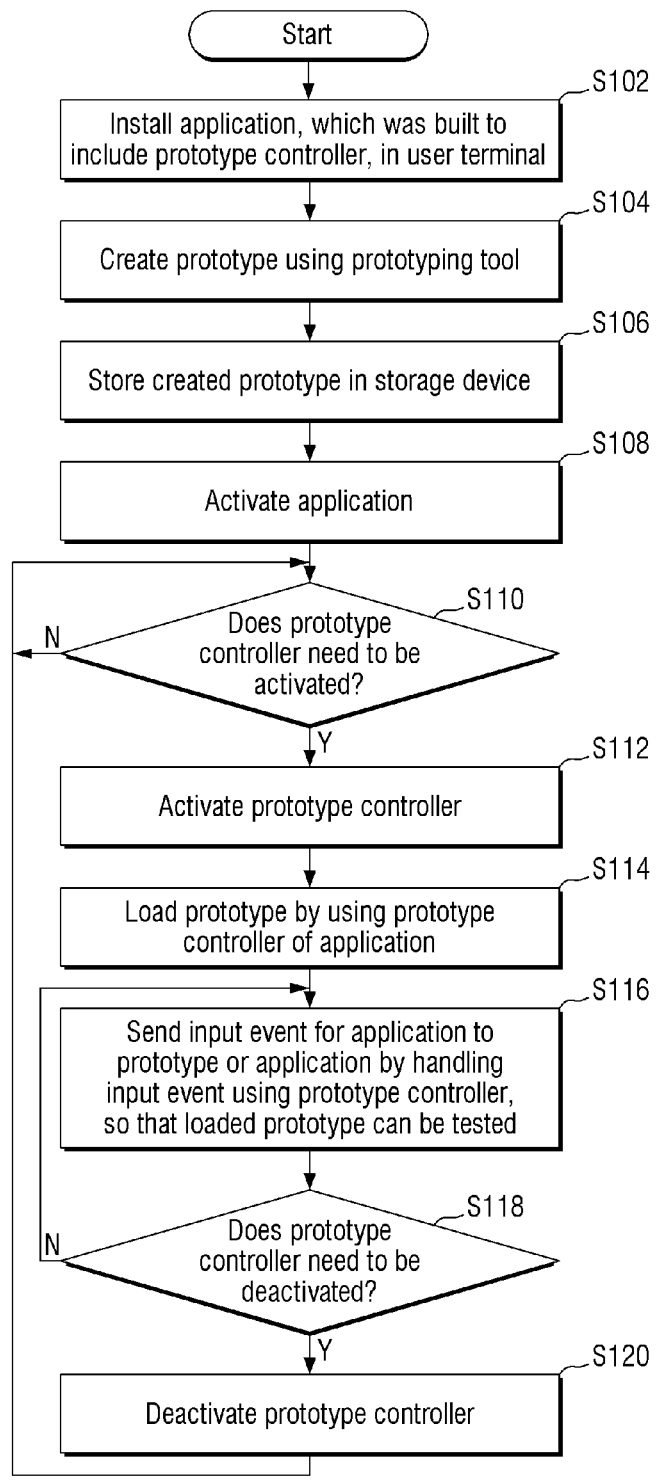
FIG. 2 is a flowchart illustrating a method of testing a prototype linked with an existing application according to an embodiment.
Figure 3:
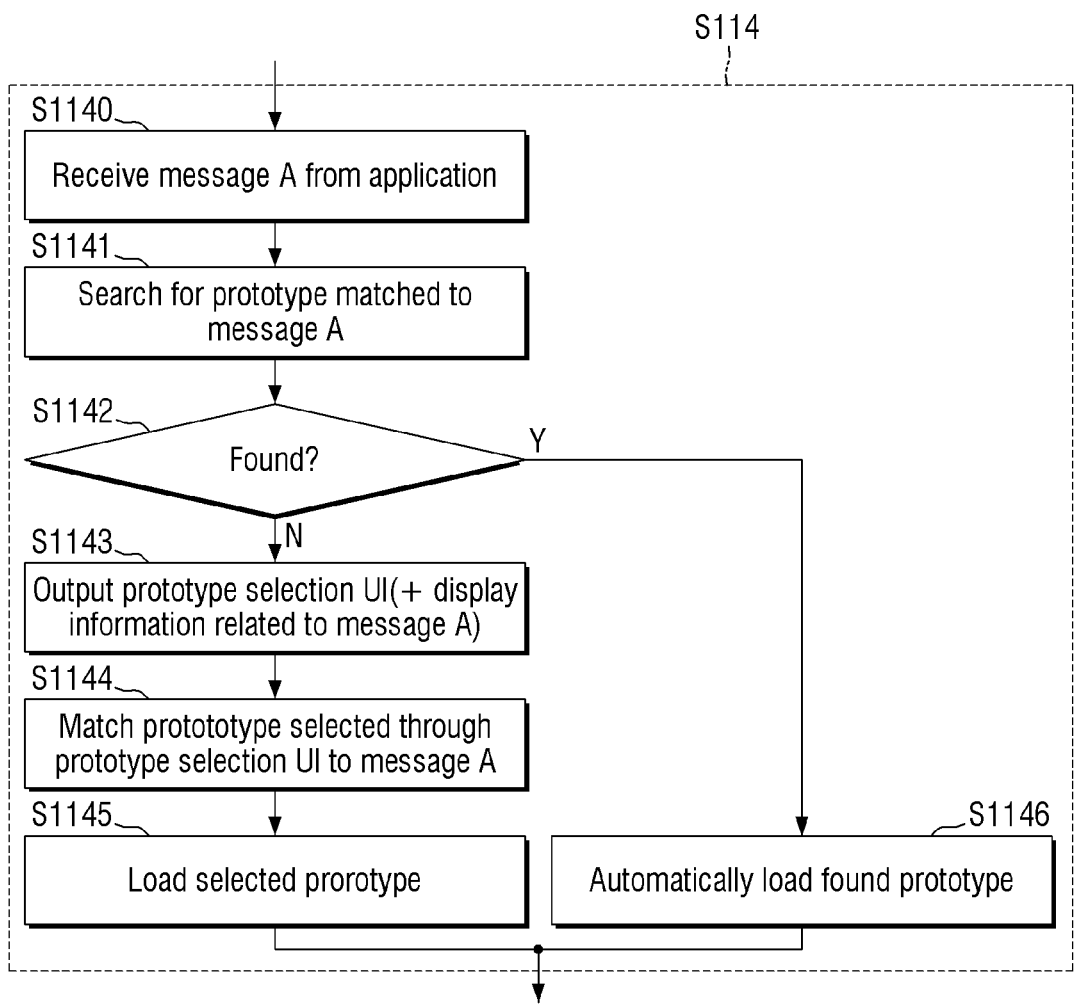
FIG. 3 is a detailed flowchart illustrating an operation in the prototype testing method of FIG. 2.
Figure 4:
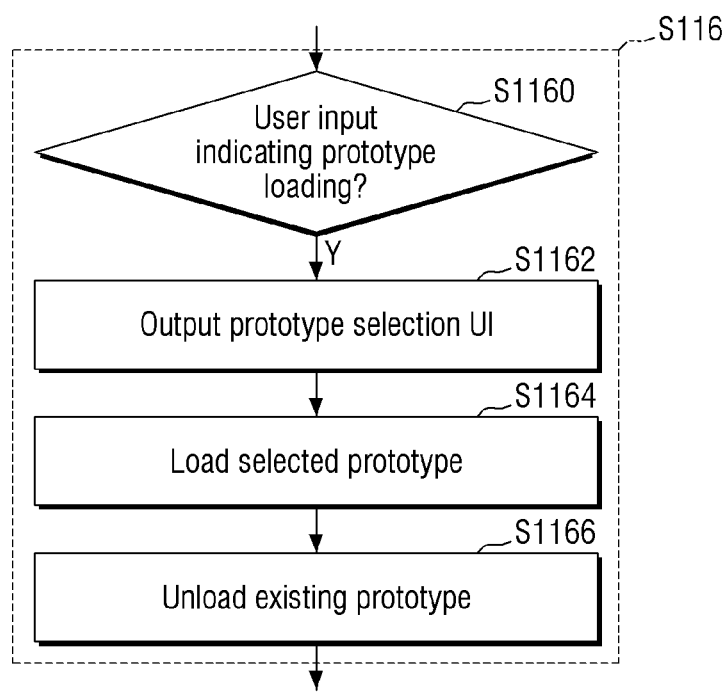
FIG. 4 is a detailed flowchart illustrating another operation in the prototype testing method of FIG. 2.

FIG. 2 is a flowchart illustrating a method of testing a prototype linked with an existing application according to an embodiment.

In operation S102, an application is installed in a user terminal. As described above, the application is linked with a prototype to be tested. The application is built to include a prototype controller. The term 'build' can be understood as a similar meaning to 'compile.'

A prototype is created using a prototyping tool in operation S104, and the created prototype is stored in a prototype storage device in operation S106. In an embodiment, the created prototype may include information about what size of display it is for or may include information about the size of the area occupied by the prototype.

In operation S108, the application is activated. In this specification, when the application is 'activated,' it means that the application is displayed on the screen and becomes an object to receive input events of the user terminal. The input events include user inputs such as touch inputs. The input events may further include values measured by sensors of the user terminal and data received from an external device by a network interface of the user terminal.

In an embodiment, when the application is activated, the prototype controller may be automatically activated. In an embodiment, it is determined in operation S110 whether the prototype controller needs to be activated. That is, the prototype controller is not always activated when the application is activated, but may be activated only in certain situations.

Some relevant embodiments are suggested below.

In a first embodiment, in a state where the prototype controller is inactive, the application is activated to display a first screen. When the application displays a second screen, the prototype controller is activated. When the second screen of the application is switched to another screen, the prototype controller is deactivated. The second screen may be a screen displayed when a specific tab is selected, a screen displayed when a specific menu is selected, a screen displayed when a specific button is pressed, a screen displayed when a specific icon is selected, a screen displayed when a specific link is selected, or a screen having a specific identifier. For example, when the application is a mobile messenger and a user interface prototype in a chat window is to be tested, the prototype controller may be deactivated in the first screen on which a friend list is displayed. Therefore, the application may operate in a manner not different from a conventional mobile messenger. However, when the first screen is switched to the second screen which is a chat window, the prototype controller may be activated. Accordingly, a prototype may be loaded and tested. When the chat window is closed, the prototype controller is deactivated. The prototype controller may be deactivated by program code of the application. Alternatively, the prototype controller may detect a screen change and then terminate itself.

In a second embodiment, the application is activated in a state where the prototype controller is inactive. When a predetermined input event occurs to the application, the prototype controller is activated. In addition, when a condition for deactivating the prototype controller is satisfied, the prototype controller is deactivated. That is, in the current embodiment, in order to test a prototype when there is a specific input to the application, the prototype controller is activated when the specific input is made. The specific input may be a user input, a value measured by a sensor included in the user terminal, or specific data received from an external device through the network interface included in the user terminal. For example, when the application is a mobile messenger and a prototype, which is a screen to be displayed when a sound is input to a microphone sensor, is to be tested, the application may usually operate in a manner not different from a conventional mobile messenger by deactivating the prototype controller. However, when a sound is input to the microphone sensor, the prototype controller is activated. Accordingly, a prototype that displays the sound input state and the like may be loaded and tested. The prototype controller may be deactivated immediately after the occurrence of the input event. That is, in this case, the condition for deactivating the prototype controller is that the input event no longer occurs. The prototype controller may also not be deactivated immediately after the occurrence of the input event, but may be deactivated when a predetermined deactivation condition is satisfied. For example, the prototype controller may be activated when the input of a first gesture is detected and may be deactivated when the input of a second gesture is detected. The first gesture and the second gesture may be touch input gestures or may be motion gestures sensed by a front camera or the like.

In a third embodiment, the application is activated in a state where the prototype controller is inactive. When the application enters a predetermined state, the prototype controller is activated. When the state of the application is changed from the predetermined state to another state, the prototype controller is deactivated. Examples of the 'state of the application' may include various states that can affect the user interface of the application, such as whether the application is in a full screen mode, in a landscape mode or in a background mode, the presence or absence of a status bar, the color of a specific area, a theme applied to the application, whether a user has logged in, screen brightness settings, and the sound volume state. For example, when the application is a mobile messenger and a prototype of a friend list display screen in the landscape mode is to be tested, the application may operate in a manner not different from a conventional mobile messenger in a portrait mode by deactivating the prototype controller in the portrait mode. However, when the mode of the mobile messenger is switched to the landscape mode, the prototype controller is activated. Accordingly, a prototype that displays a friend list in the landscape mode may be loaded and tested.

In a fourth embodiment, the prototype controller may be activated depending on whether a combination condition, which is a result of combining two or more of the first embodiment, the second embodiment and the third embodiment using a logical operation (AND, OR, NOT, XOR, NAND), is satisfied. The prototype controller may also be deactivated depending on whether the combination condition, which is the result of combining two or more of the first embodiment, the second embodiment and the third embodiment using the logical operation (AND, OR, NOT, XOR, NAND), is satisfied.

Figure 5:
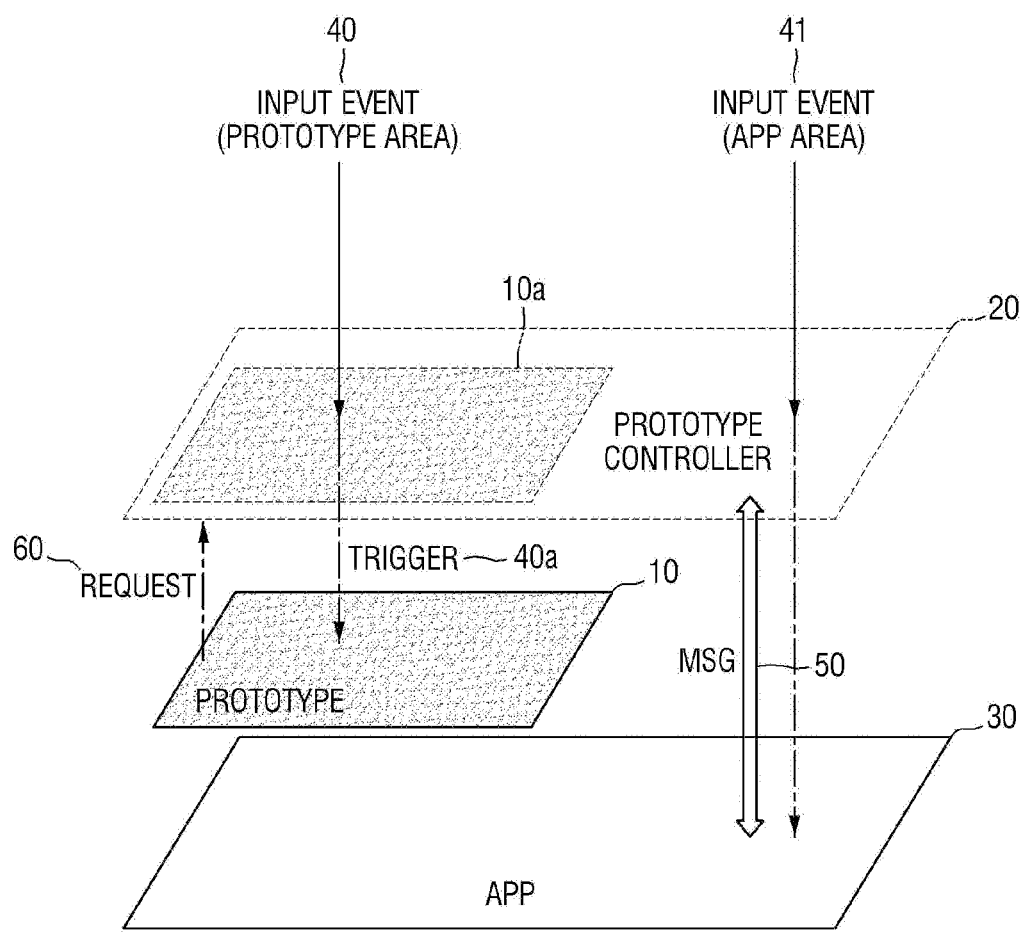
FIG. 5 is a conceptual diagram illustrating the communication between a prototype and a prototype controller and between the prototype controller and an application in the method of FIG. 2.

Next, the communication between the prototype and the prototype controller and the communication between the prototype controller and the application according to the current embodiment will be described with reference to FIG. 5. Referring to FIG. 5, a message 50 in a predetermined format may be exchanged between a prototype controller 20 and an application 30.

For example, the application 30 may transmit and receive the message 50 by calling a data transmission/reception application programming interface (API) of the prototype controller 20.

In addition, signals are exchanged between the prototype controller 20 and the application 30. The prototype controller 20 has a screen stacked on a prototype controller area which is at least part of the screen of the application 30. Therefore, the prototype controller 20 receives an input event corresponding to the prototype controller area with top priority among input events for the application 30.

The prototype controller 20 handles the received input event. The handling of the input event may include determining whether to send the received input event to a prototype 10, to the application 30, or to both the prototype 10 and the application 30. For example, a touch input event 40 in a prototype area 10a is sent to the prototype 10, and a touch input event 41 in an application area outside the prototype area 10a is passed to the application 30.

The prototype controller 20 converts the input event into a trigger and provides the trigger to the prototype 10. The prototype 10 is a set of interactions that, when a trigger for an object occurs, define responses of the object. When an input event for the application 30 is to be provided to the prototype 10, the prototype controller 20 may convert the input event into a trigger and provide the trigger to the prototype 10, so that the prototype 10 can output a response to the input event for the application 30. For example, when the user terminal senses a touch input (tap) to the prototype area 10a, an operating system of the user terminal provides the touch input (tap) to the currently active application 30. The prototype controller 20 receives the touch input and determines whether the touch input should be provided to the prototype 10. Since the touch input was made within the prototype area 10a, the prototype controller 20 provides a trigger indicating the touch input to the prototype 10. The prototype 10 which receives the trigger selects an object to be provided with the trigger and outputs a response of the object to the trigger.

The prototype 10 may provide a request 60 to the prototype controller 20. For example, the request 60 may be intended to deactivate the prototype controller 20. The prototype controller 20 may be terminated in a particular situation according to some embodiments using a program source of the application 30. However, if the prototype area 10a is the same as the application area, user input to the application 30 may be impossible. In this case, only the prototype 10 may be manipulated to deactivate the prototype controller 20 and return to the screen of the application 30.

The request 60 may also be intended to change the prototype controller area. That is, after the prototype controller 20 converts an input event into a trigger and sends the trigger to the prototype 10, the prototype 10 may make the request 60 to change the prototype controller area. According to the current embodiment, it is possible to prototype even an area that passes message to the application or change the position of the prototype.

The following operations of the prototype testing method according to the current embodiment will be described with reference to FIG. 2 again. In operation S114, the prototype controller of the application loads a prototype. The prototype controller may perform an operation for loading the prototype in response to a message received from the application. The current embodiment will be described with reference to FIG. 3.

In operation S1140, the prototype controller receives a message from the application. The message includes the state of the application, a screen code after switching of the application, or an input event for the application. In response to the message received, the prototype controller searches for a prototype matched to the received message in operation S1141. If the message has been received for the first time, it may be determined in operation S1142 that there is no prototype matched to the received message. In this case, the prototype controller outputs a user interface for selecting a prototype in operation S1143. When a prototype is selected through the user interface in operation S1144, the selected prototype is matched to the received message and loaded in operation S1145. If the message was received before and a specific prototype was matched to the message at that time, the matched prototype is automatically loaded in operations S142 and S1146.

The prototype controller allocates the prototype controller area to a prototype area for displaying the loaded prototype. The prototype controller may allocate the entire prototype controller area to the prototype area or allocate a part of the prototype controller area to the prototype area. In an embodiment, information about the prototype area may be included in the prototype. The information about the prototype area may define the prototype area, for example, in the form of relative coordinates to the prototype controller area. In this case, the prototype controller does not need to create several versions for each prototype area.

In an embodiment, the prototype controller may load at least one of prototypes matching the display size of the user terminal among a plurality of prototypes stored in the prototype storage device. For example, the prototype controller may obtain information about the display size of the user terminal and display only prototypes matching the display size on the user interface for selecting a prototype. Accordingly, the prototypes matching the display size of the user terminal among the prototypes stored in the prototype storage device may be loaded.

Figure 6:
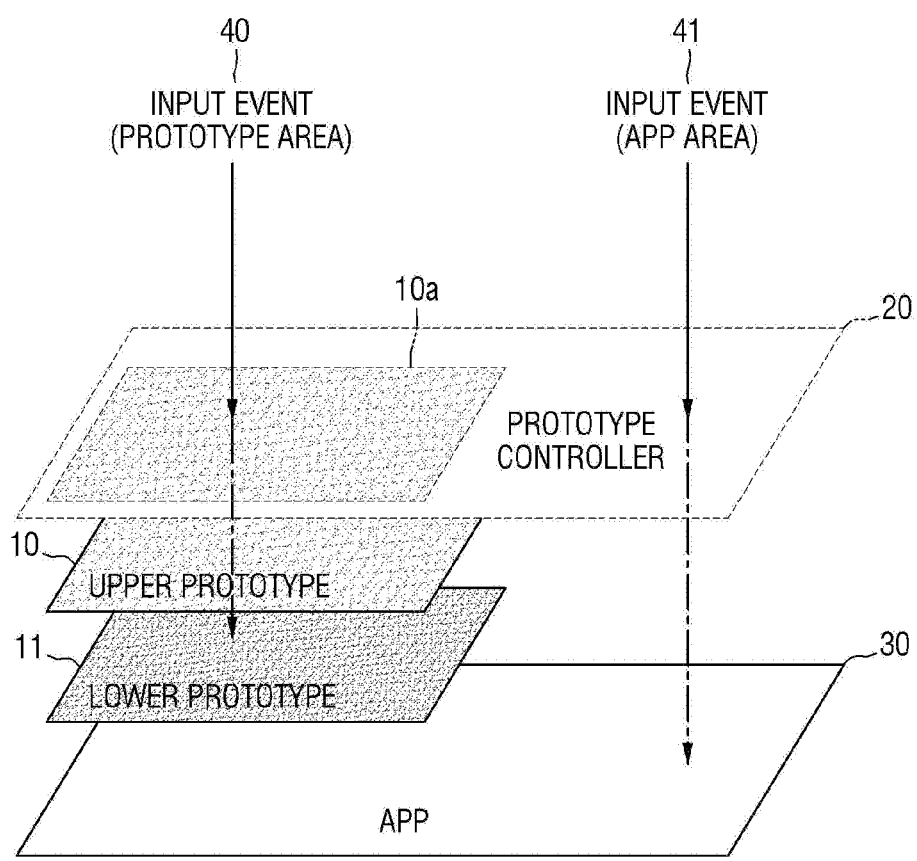
FIG. 6 is a conceptual diagram illustrating a case where the prototype controller stacks a plurality of prototypes to be tested in the method of FIG. 2.
Figure 7:
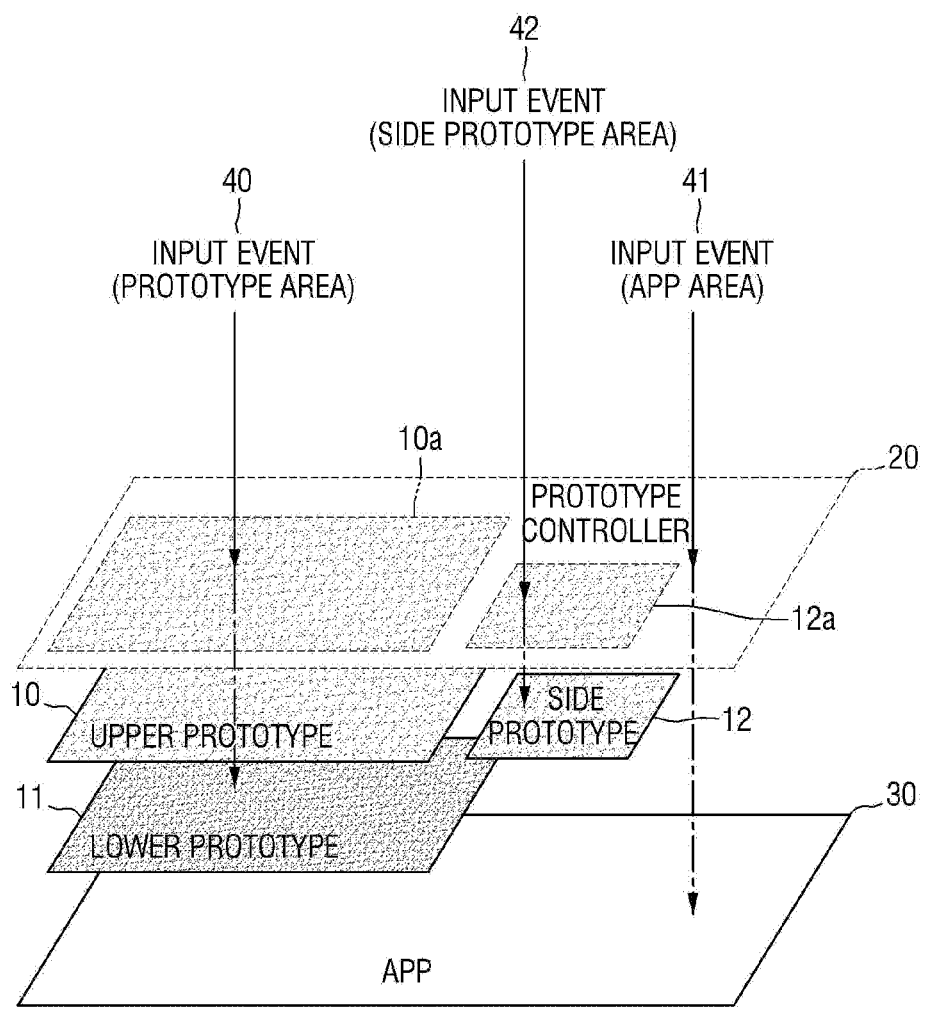
FIG. 7 is a conceptual diagram illustrating a case where the prototype controller places a plurality of prototypes to be tested at different positions in the method of FIG. 2.

In an embodiment, the prototype controller may stack a plurality of prototypes 10 and 11 over each other as illustrated in FIG. 6. Here, the prototype controller may provide a user interface for adjusting the priority order of the prototypes. In addition, a side prototype 12 which is not overlapped at least partially may be additionally loaded as illustrated in FIG. 7.

Next, the following operations of the prototype testing method according to the current embodiment will be described with reference to FIG. 2 again.

In operation S116, the prototype controller sends an input event for the application to the prototype or the application by handling the input event, so that the loaded prototype can be tested.

As described above, when the prototype controller handles an input event, it means that the prototype controller determines whether to send the input event to the prototype, to the application, or to both the prototype and the application. For example, in FIG. 5, the touch input event 40 in the prototype area 10a is sent to the prototype 10, and the touch input event 41 in the application area outside the prototype area 10*a* is passed to the application 30. In addition, in FIG. 6, a touch input event 40 in the prototype area 10*a* is sent to all of the prototypes 10 and 11 stacked, and a touch input event 41 in the application area outside the prototype area 10*a* is passed to the application 30. In addition, in FIG. 7, a touch input event 40 in the prototype area 10*a* is sent to all of the prototypes 10 and 11 stacked, a touch input event 42 in a side prototype area 12*a* is sent to the side prototype 12, and a touch input event 41 in the application area outside the prototype area 10*a* is passed to the application 30.

In an embodiment, in the handling of the input event, the prototype controller may send an input event (such as a touch input event) not related to specific position coordinates to all loaded prototypes and the application, so that responses of the prototypes and the application 30 to the input event can be tested comprehensively. In an embodiment, in the handling of the input event, the prototype controller may send an input event (such as a touch input event) not related to specific position coordinates to a loaded prototype if there is the loaded prototype. The prototype controller may send the input event to the application only when there is no loaded prototype. Therefore, the test can be concentrated on the response of the prototype itself.

The prototype controller may perform the operation for loading the prototype in response to a user input indicating prototype loading. When there are a plurality of different prototypes for a specific situation, the current embodiment is useful for testing a user interface while changing the prototypes. This embodiment will now be described with reference to FIG. 4.

In operation S1160, the prototype controller receives a user input indicating prototype loading. The prototype controller may pass all input events to the application as they are before a prototype is loaded. Therefore, the user input indicating prototype loading may be any one of user inputs not received by the application.

In operation S1162, the prototype controller outputs a user interface for selecting a prototype. When a prototype is selected through the user interface, the selected prototype is matched to the received message and loaded in operation S1164, and a previously loaded prototype is unloaded in operation S1166.

The following operations will be described with reference to FIG. 2 again.

It is determined in operation S118 whether the prototype controller needs to be deactivated. Since the situations where the prototype controller needs to be deactivated have been described above in operation S110, they will not be described again. If the deactivation of the prototype controller is necessary, the prototype controller may terminate an instance by itself or send a message for requesting the termination of the prototype controller to the application in operation S120.

Figure 8:
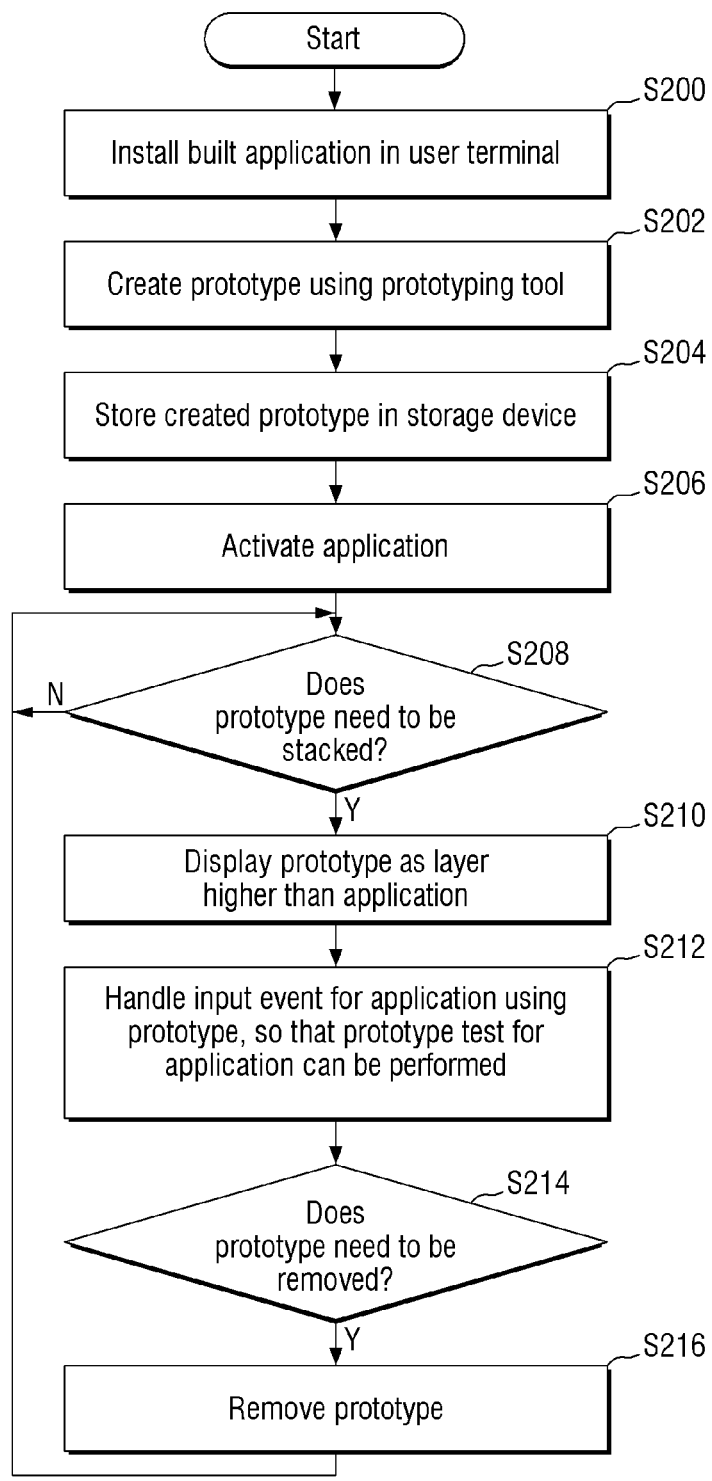
FIG. 8 is a flowchart illustrating a method of testing a prototype linked with an existing application according to an embodiment.
Figure 9:
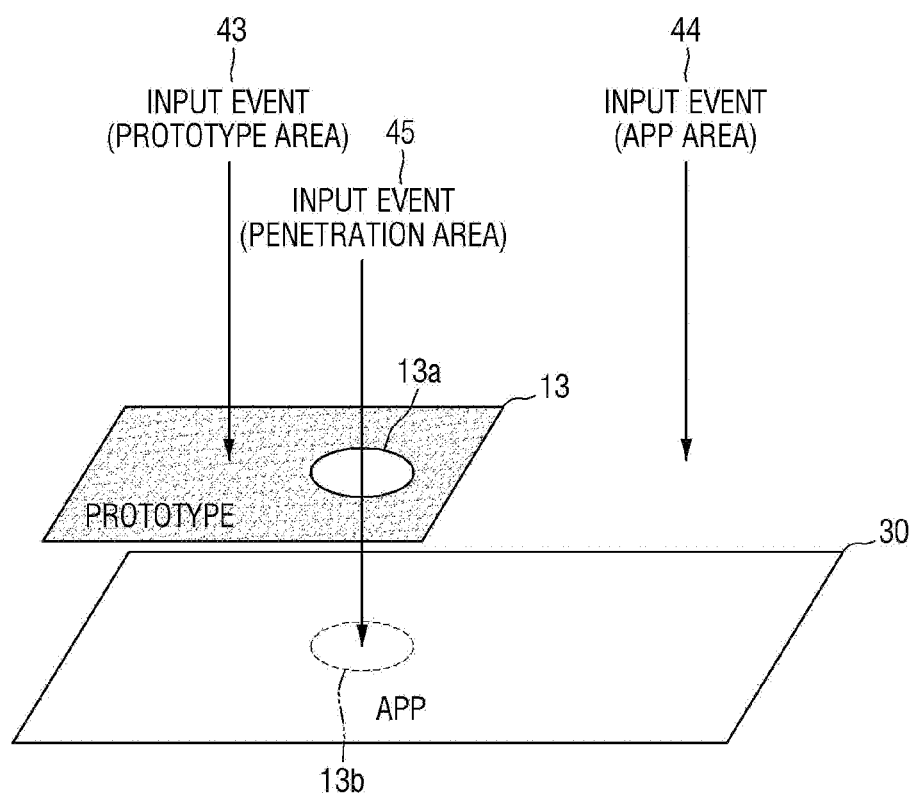
FIG. 9 is a conceptual diagram illustrating how input events are handled by a prototype and an application in the method of FIG. 8.

FIG. 8 is a flowchart illustrating a method of testing a prototype linked with an existing application according to an embodiment. In the current embodiment, it is assumed that a prototype 13 is displayed as a layer higher than an application 30 as illustrated in FIG. 9.

In operation S200, an application is installed in a user terminal.

In operation S202, a prototype is created using a prototyping tool.

In operation S204, the created prototype is stored in a storage device.

In operation S206, the application is activated.

In operation S208, it is determined whether a prototype needs to be stacked, that is, needs to be output. The criteria for determination in the current operation can be found in the description of operation S110 in FIG. 2. That is, when the screen of the application is switched to a specific screen, when a specific input event occurs to the application, or when the state of the application is switched to a specific state, it may be determined that the prototype needs to be stacked.

In operation S210, the prototype is displayed as a layer higher than the application.

In operation S212, the prototype handles an input event for the application, so that a prototype test for the application can be performed. Referring to FIG. 9, the prototype 13 is stacked on a part of the screen of the application 30 as a layer higher than the application 30. Therefore, an input event 43 for the application 30 in a prototype area is provided to the prototype 13, and a response of the prototype 13 to the input event is output. An input event 45 for the application 30 in a penetration area 13*a* is sent to the application 30 as it is by the prototype 13, so that a corresponding area 13*b* of the application 30 receives the input event 45. An input event 44 outside the prototype area is provided to the application 30.

Figure 10:
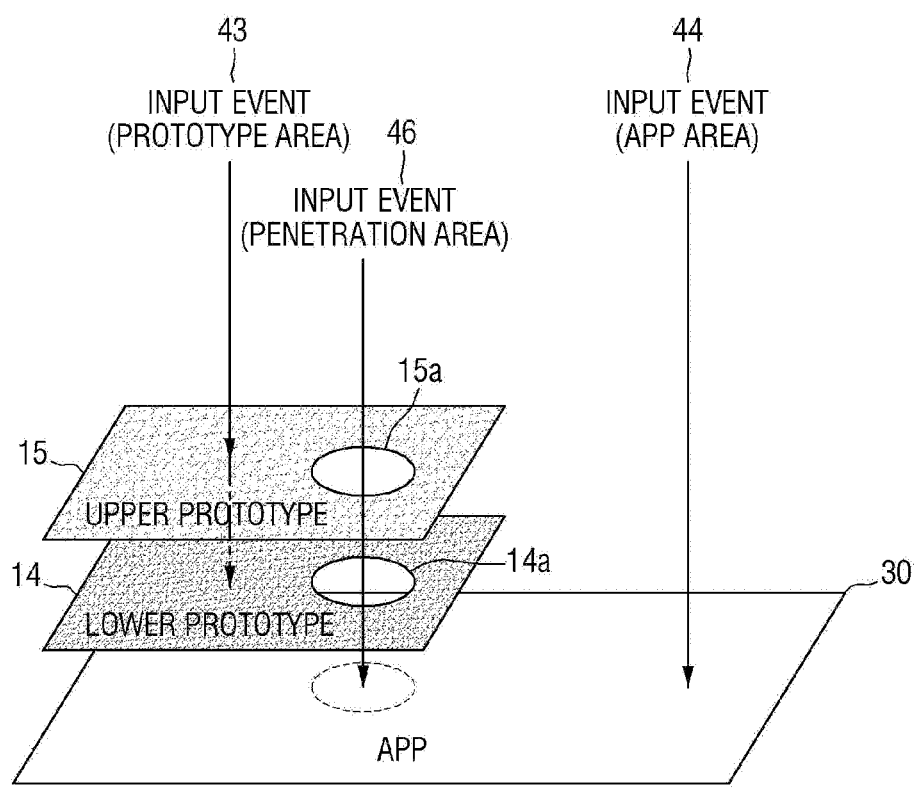
FIGS. 10 and 11 are conceptual diagrams illustrating a case where a prototype controller stacks a plurality of prototypes to be tested in the method of FIG. 8.
Figure 11:
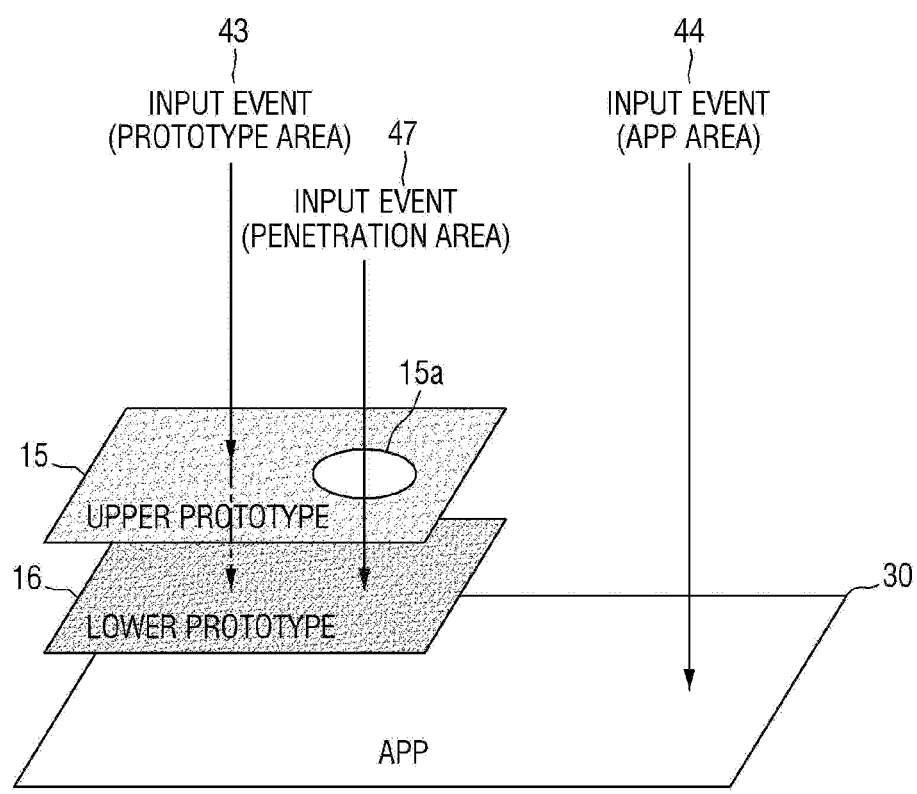

Referring to FIG. 10, a plurality of prototypes 14 and 15 may be stacked over each other as layers higher than the application 30. Even in this case, an input event 46 in penetration areas 14*a* and 15*a* is passed to the application 30 as it is by the prototype 13, so that a corresponding area of the application 30 receives the input event 46. In an embodiment, as illustrated in FIG. 11, a penetration area 15*a* may be formed only in one of the prototypes 15 and 16. In this case, an input event 47 in the penetration area 15*a* may be provided to the application 30.

Figure 12:
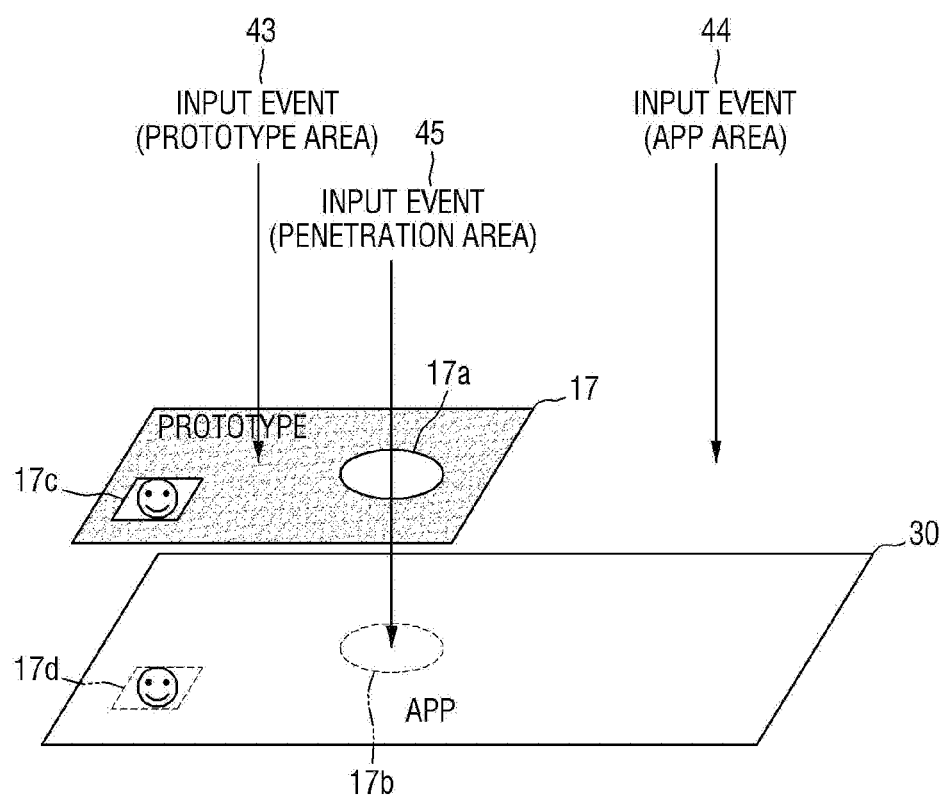
FIG. 12 is a conceptual diagram illustrating an operation in a case where a prototype has a screen shot area in the method of FIG. 8.

Referring to FIG. 12, a screen shot area 17*c* may be formed in a prototype 17. The screen shot area 17*c* is an area of the screen of the application 30 which is filled with an image of the screen shot area when the prototype 17 is displayed. In FIG. 12, an image of a corresponding area 17*d* of the application 30 at a time when the prototype 17 is loaded is rendered as an image of the screen shot area 17*c* of the prototype 17. Thus, during the prototype test, the screen shot area 17*c* may be display as if the prototype 17 did not cover the application 30 while enabling a response to an input event to be established on the prototype 17.

The following description will be made with reference to FIG. 8 again.

It is determined in operation S214 whether the prototype needs to be removed. The criteria for determination in the current operation can be found in the description of operation S118 in FIG. 2. That is, when the screen of the application is switched from a prototype test target screen to another screen, when a prototype test target event no longer occurs to the application, or when the state of the application is switched from a prototype test target state to another state, the prototype test is terminated, and the original function of the application is executed.

The methods according to the embodiments described above can be performed by the execution of a computer program implemented as computer-readable code. The computer program may be transmitted from a first computing device to a second computing device through a network such as the Internet and may be installed in the second computing device and used in the second computing device. Examples of the first computing device and the second computing device include fixed computing devices such as a server, a physical server belonging to a server pool for a cloud service, and a desktop PC.

The computer program may be stored in a recording medium such as a DVD-ROM or a flash memory.

The configuration and operation of a user terminal that performs a prototype testing function according to an embodiment will now be described with reference to FIG. 13. It should be noted that embodiments related to the methods described above with reference to FIGS. 1 through 12 are applicable to the configuration and operation of the user terminal according to the current embodiment.

Figure 13:
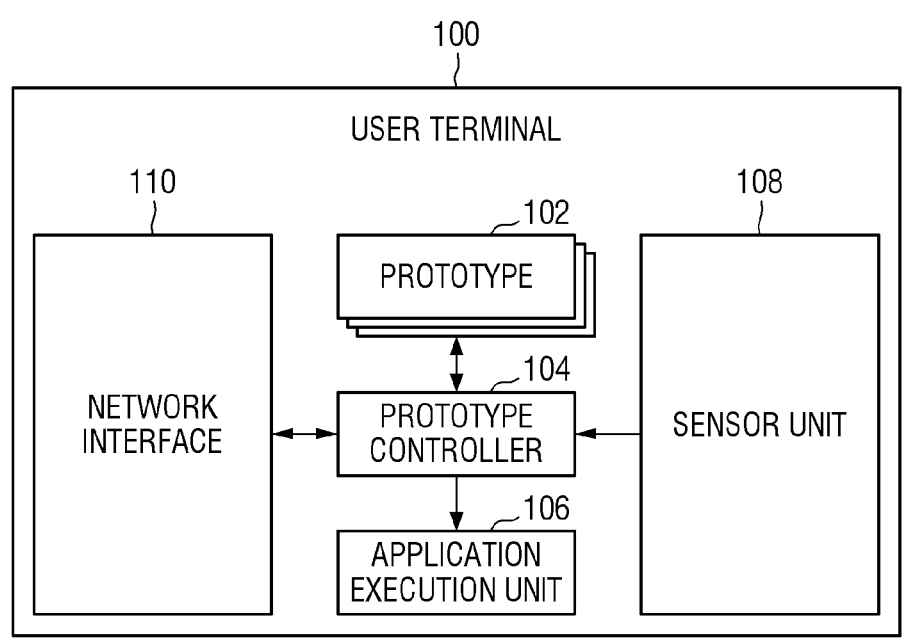
FIG. 13 is a block diagram of a user terminal that performs a prototype testing function according to an embodiment.

Referring to FIG. 13, the user terminal according to the current embodiment includes a display (not illustrated), a prototype controller 104, and an application execution unit 106. In addition, the user terminal may further include a storage unit for storing prototype data 102. For example, the storage unit may be a built-in flash memory.

The prototype controller 104 and the application execution unit 106 may be a plurality of operations loaded on a random access memory (RAM) (not illustrated) and executed by a processor (not illustrated). Alternatively, the prototype controller 104 may refer to a first processor that executes the functions of a prototype controller described below, and the application execution unit 106 may refer to a second processor that executes the functions of an application.

The application execution unit 106 activates the prototype controller 104 when a specific condition is satisfied. The specific condition may refer to a case where the screen of the application is switched to a prototype test target screen, a case where a prototype test target event occurs to the application, a case where the state of the application is switched to a prototype test target state, or the like.

The application execution unit 106 and the prototype controller 104 transmit and receive a message in a predetermined format by calling an API. The API may be a function provided by the prototype controller 104 or a function provided by the application execution unit 106.

After being activated, the prototype controller stacks a topmost transparent screen, which is formed in at least part of the application, on a screen generated and displayed by the application execution unit 106.

After being activated, the prototype controller 104 loads a prototype using the prototype data 102. Unlike in FIG. 13, the prototype controller 104 can receive prototype data (not illustrated) stored in an external device through a network interface 110 and load the prototype. The prototype controller 104 loads the prototype and sets the prototype to be displayed on a prototype area, which is at least part of a prototype controller area allocated to the prototype controller, in the screen of the application.

When input events for the application are generated, the prototype controller 104 receives at least some of the input events with top priority and sends the received input events to the application as they are or sends the received input events to the loaded prototype.

The input events may be generated using values measured by various sensors of a sensor unit 108 or may be generated using data received from an external device through the network interface 110.

The methods according to the embodiments described above can be performed by the execution of a computer program implemented as computer-readable code. The computer program may be transmitted from a first computing device to a second computing device through a network such as the Internet and may be installed in the second computing device and used in the second computing device. Examples of the first computing device and the second computing device include fixed computing devices such as a server, a physical server belonging to a server pool for a cloud service, and a desktop PC.

The computer program may be stored in a non-transitory recording medium such as a DVD-ROM or a flash memory.

The concepts of the invention described above can be embodied as computer-readable code on a computer-readable medium. The computer-readable medium may be, for example, a removable recording medium (a CD, a DVD, a Blu-ray disc, a USB storage device, or a removable hard disc) or a fixed recording medium (a ROM, a RAM, or a computer-embedded hard disc). The computer program recorded on the computer-readable recording medium may be transmitted to another computing apparatus via a network such as the Internet and installed in the computing apparatus. Hence, the computer program can be used in the computing apparatus.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A method of testing a GUI (Graphic User Interface) prototype linked with an application without rebuilding the application, the method being performed by a user terminal and comprising:

activating, by using the user terminal in which the application is installed, the application built to comprise a prototype controller;

receiving, by using the activated application and searching for at least one GUI prototype matched to the received message in response to the received message;

loading, by using the prototype controller, the at least one GUI prototype on a memory from a prototype storage device storing a plurality of GUI prototypes generated in a prototyping device, the prototyping device and prototype storage device are connected with the user terminal via a network;

setting, by using the prototype controller, the at least one GUI prototype to be displayed on a prototype area, which is at least part of a display area of the application;

detecting user input events to the application;

receiving, by using the prototype controller, at least one user input event; and sending, by using the prototype controller, the received at least one user input event to the loaded GUI prototype.

2. The method of claim 1, wherein the loading of the at least one GUI prototype comprises:

loading the at least one GUI prototype by using the prototype controller if the at least one GUI prototype matched to the received message is searched.

3. The method of claim 1, wherein the loading of the at least one GUI prototype further comprises:
   outputting a user interface for selecting a GUI prototype by using the prototype controller if there is no GUI prototype matched to the received message;
   matching the received message to the GUI prototype selected through the user interface by using the prototype controller; and
   loading the selected GUI prototype by using the prototype controller.

4. The method of claim 1, wherein the loading of the at least one GUI prototype comprises:
   loading a first GUI prototype and a second GUI prototype by using the prototype controller,
   wherein the first GUI prototype is loaded as a first layer higher than the application, the second GUI prototype is loaded as a second layer higher than the application, the first layer is different to the second layer.

5. The method of claim 4, wherein the loading of the first and the second GUI prototype comprises:
   displaying the first GUI prototype and the second GUI prototype by using the prototype controller such that the first GUI prototype and the second GUI prototype are stacked to at least partially overlap each other according to a priority order of the first GUI prototype and the second GUI prototype.

6. The method of claim 4, wherein the loading of the at least one GUI prototype further comprises:
   loading a side GUI prototype by using the prototype controller,
   wherein the side GUI prototype is not overlapped with the first GUI prototype and the second GUI prototype.

7. A user terminal configured to:
   activate an application built to comprise a prototype controller;
   receive a message from the activated application;
   search for at least one GUI (Graphic User Interface) prototype matched to the received message in response to the received message;
   load the at least one GUI prototype matched with the received message on a memory from a prototype storage device storing a plurality of GUI prototypes generated in a prototyping device;
   set the at least one GUI prototype to be displayed on a prototype area, which is at least part of a display area of the application;
   detect user input events to the application;
   receive at least one user input event; and
   send the received at least one user input event to the at least one GUI prototype,
   wherein the at least one GUI prototype is linked with the application without rebuilding the application, and
   wherein the prototyping device and the prototype storage device are connected with the user terminal via a network.

* * * * *